United States Patent
Bogdahn et al.

(10) Patent No.: US 9,439,400 B2
(45) Date of Patent: Sep. 13, 2016

(54) DEVICE FOR ROLLING UP AND UNROLLING A LEASH

(75) Inventors: Manfred Bogdahn, Hamburg (DE); Jürgen Groth, Groß Schenkenberg (DE)

(73) Assignee: flexi-Bogdahn Technik GmbH & Co. KG, Bargteheide (DE)

( * ) Notice: Subject to any disclaimer, the term of this patent is extended or adjusted under 35 U.S.C. 154(b) by 554 days.

(21) Appl. No.: 13/590,513

(22) Filed: Aug. 21, 2012

(65) Prior Publication Data
US 2013/0200197 A1 Aug. 8, 2013

(30) Foreign Application Priority Data
Aug. 23, 2011 (DE) .................. 10 2011 110 835

(51) Int. Cl.
*B65H 75/30* (2006.01)
*A01K 27/00* (2006.01)
*B65H 75/44* (2006.01)

(52) U.S. Cl.
CPC ......... *A01K 27/004* (2013.01); *B65H 75/4431* (2013.01); *B65H 2701/35* (2013.01)

(58) Field of Classification Search
CPC ............. A01K 27/004; A01K 27/007; B65H 75/4431
USPC ........... 242/396, 396.1, 396.2, 396.4, 422.4, 242/385, 385.4, 394; 119/794, 796
See application file for complete search history.

(56) References Cited

U.S. PATENT DOCUMENTS

| 7,040,257 | B2 * | 5/2006 | Waxman et al. ............. 119/796 |
| 7,168,393 | B2 * | 1/2007 | Bogdahn et al. ............. 119/796 |
| 8,528,850 | B2 * | 9/2013 | Bogdahn .................... 242/396.1 |
| 2008/0230015 | A1 * | 9/2008 | Bleshoy ....................... 119/796 |
| 2010/0206246 | A1 | 8/2010 | Waldrep |
| 2011/0067649 | A1 | 3/2011 | O'Brien et al. |
| 2011/0146592 | A1 * | 6/2011 | Friedrichsen ................ 119/796 |
| 2011/0180017 | A1 | 7/2011 | Goldenberg |
| 2012/0205479 | A1 * | 8/2012 | Wang ......................... 242/396.4 |

FOREIGN PATENT DOCUMENTS

| DE | 85 09 585 U1 | 7/1986 |
| DE | 200 19 939 U1 | 6/2001 |
| EP | 0 093 445 A1 | 11/1983 |
| JP | 2006 174738 A | 7/2006 |
| WO | 01/13713 A1 | 3/2001 |

* cited by examiner

*Primary Examiner* — William A Rivera
(74) *Attorney, Agent, or Firm* — McGlew and Tuttle, P.C.

(57) ABSTRACT

A device (10, 36, 39) for rolling up and unrolling a leash, especially for leading an animal, includes a leash roller (11) and a blocking device (22), which has an actuating element (37) and a locking element (26). The leash roller (11) can be actuated by the blocking device (22) for blocking an unrolling motion of the leash roller (11). The actuating element (37) can be actuated by an actuation motion. A locking motion of the locking element (26) can be triggered for blocking the unrolling motion of the leash roller (11) based on the actuation motion of the actuating element (37). Generation of a disturbing noise, with the blocking device, is avoided by the actuation motion of the device (10, 36, 39) being transferred by a transfer device (23) into a locking motion of the locking element (26) that is greater than the actuation motion.

20 Claims, 5 Drawing Sheets

DEVICE FOR ROLLING UP AND UNROLLING A LEASH

CROSS REFERENCE TO RELATED APPLICATIONS

This application claims the benefit of priority under 35 U.S.C. §119 of German Patent Application DE 10 2011 110 835.5 filed Aug. 23, 2011, the entire contents of which are incorporated herein by reference.

FIELD OF THE INVENTION

The present invention pertains to a device for rolling up and unrolling a leash, especially for leading an animal, with a leash roller, and with a blocking means, which has an actuating element and a locking element, wherein the leash roller can be blocked by means of the blocking means for blocking an unrolling motion of the leash roller and the actuating element can be actuated by means of an actuating motion, and wherein a locking motion of the locking element can be triggered for blocking the unrolling motion of the leash roller based on the actuating motion of the actuating element.

BACKGROUND OF THE INVENTION

Such a device is known from DE 200 19 939 U1. The actuating element of the blocking means is designed as a brake button, which can be moved into an active position for blocking an unrolling motion during actuation by a person by pressing down the brake button. Based on the actuation of the actuating element, a locking element is moved, in addition, into an active position for blocking the unrolling motion. The locking element can come into contact in the active position with one of a plurality of projections along the circumference of the leash roller, so that an unrolling motion is prevented from occurring. The projection has a first flank, with which the locking element comes into contact. This first flank is arranged at right angles to an acute opening angle to a circumferential surface of the leash roller.

The drawback of this is that a great actuation motion is necessary on the part of a person operating the device to actuate the actuating element and/or to reach an active position for the locking element for blocking the unrolling motion of the leash roller. As a result, there is a risk of fatigue, especially of the thumb used to actuate the actuating element in case of repeated activity.

In addition, there is a risk that the locking element would slide over the projections in a position in which it is not pressed or pivoted down sufficiently in the direction of a projection and in case of a pulling load on the leash in the direction of the unrolling motion. Undesired disturbing noises, especially rattling and increased wear occur now. Due to the great actuating motion necessary for the actuating element, there is a large area that is susceptible to the development of disturbing noises between an unactuated position of the actuating element and a fully actuated, especially pressed, position of the actuating element.

SUMMARY OF THE INVENTION

An underlying object of the present invention is therefore to improve a device of the type mentioned in the introduction such that positioning of the blocking means such that a disturbing noise is generated is made as difficult as possible and operating comfort is improved at the same time.

To accomplish the underlying object of the present invention, the device of the type mentioned in the introduction is characterized in that the actuating motion can be transmitted by means of a transfer means into a locking motion of the locking element that is greater than the actuating motion.

It is advantageous here that based on the transfer means, a slighter and/or smaller actuating motion is necessary to actuate the blocking means and to block the unrolling motion of the leash roller by means of the locking element. In particular, an actuation section and/or an actuation stroke of the actuating element can be markedly reduced. As a result, the operating comfort of the device for the person is improved. Premature fatigue of the person is avoidable during repeated actuation of the blocking means or of the actuating element.

In addition, it can be guaranteed by means of the transfer means that the actuating motion can be transferred, especially transmitted into a locking motion of the locking element that is sufficiently great for blocking the unrolling motion of the leash roller. In particular, a short actuation section and/or a short stroke is sufficient for actuating the actuating element in order to bring about a sufficient locking motion for blocking the unrolling motion of the leash roller by means of the locking element. A smaller actuating motion compared to the locking motion can be transferred, especially transmitted, into a greater locking motion compared to the actuating motion by means of the transmission means. The transfer means is preferably designed as a transmission means.

The present invention pertains, in particular, to a device for rolling up and unrolling a leash for leading an animal, especially for a dog and/or a cat. The leash, especially a rope, a cord and/or a belt, can be unrolled against the force of a retracting element, preferably a spring, in a resting position of the blocking means. If no pulling force is acting on the leash in the direction of the unrolling motion of the leash roller, is leash is rolling automatically up on the leash roller based on the force of the retracting element. The blocking means can be operated by a person by means of the actuating element. The actuating element is designed especially as a brake button. The actuating element can be designed as a displaceable and/or pivotable actuating element. Blocking of the unrolling motion can be achieved by means of the locking element. A rolling-up motion can be blocked at the same time at least extensively when blocking the unrolling motion. As an alternative, a rolling-up motion can continue to be possible during blocking of the unrolling motion.

The transfer means preferably has a mechanical, electric, pneumatic and/or hydraulic transmission, especially a lever mechanism. Consequently, a small actuating motion, especially one brought about mechanically, can be transferred and/or transmitted into a greater locking motion. In case of an electric transmission, the electric transmission can be actuated based on an actuating motion of an actuating element, especially of a switch and/or button. The locking motion of the locking element can be triggered here by means of the electric transmission.

In particular, there is a transmission ratio in the range of 1.25:1 to 10:1 and especially in the range of 1.5:1 to 5:1 between the locking motion and the actuating motion. A transmission ratio of 2:1 is especially preferably provided. The risk of development of disturbing noises can be reduced by at least 50% in case of such a transmission ratio. Thus, it is possible to use as the transmission means a transmission that transmits the smaller actuating motion into a greater locking motion compared thereto. A lever mechanism is especially suitable for embodying a suitable transmission.

The locking element may be pivotable in relation to the actuating element. The actuating motion of the actuating element can thus be converted into a pivoting motion of the locking element. The locking element may be connected here pivotably to the actuating element. The actuating motion can be transferred and/or transmitted hereby directly into the locking motion.

According to another embodiment, at least one projection is associated with the leash roller, and a first flank of the projection cooperates with the locking element in an active position for blocking the unrolling motion of the leash roller. The first flank of the projection is preferably arranged with an obtuse opening angle to a circumferential surface of the leash roller. It is advantageous here that based on an obtuse opening angle between the first flank of the projection and the circumferential surface of the leash roller and/or a tangent to the circumferential surface at the intersection of the first flank with the circumferential surface, positioning of the locking element such that disturbing noises are generated is made difficult. In addition, constructions are made possible that make a simplified and comfortable operation possible. Furthermore, the overall height of the projections can be reduced, as a result of which the actuating motion needed, the actuation section and/or a stroke of the actuating element can be reduced, especially by 20%.

The obtuse opening angle is preferably between 100° and 150° and especially between 110° and 140°. The obtuse opening angle especially preferably equals 120°. A functional and compact mode of construction is made possible hereby. In particular, a plurality of projections are provided. The unrolling motion can be reduced hereby to a minimum after actuation of the blocking means. The plurality of projections are preferably distributed uniformly on the circumference of the leash roller. The circumferential surface may be designed as a second flank of at least one additional projection. The obtuse opening angle is thus formed between the second flank of a first projection and the first flank of a second projection, the first projection being arranged in front of the second projection in the direction of the unrolling motion.

According to another embodiment, the locking element is designed as a stop face designed especially corresponding to the first flank. Reliable blocking of the leash roller in the direction of the unrolling motion can be achieved by means of the stop face. The stop face is preferably in contact, at least partly, especially flatly, with the first flank in an active position for blocking the unrolling motion of the leash roller. Reliable support can be achieved hereby in the active position. In addition, an especially stable construction can be embodied based on a flat support of the forces acting on the stop face and/or the first flank.

In particular, the stop face is pivotable tangentially and/or at least over a segment of a circle about its pivot axis. This makes possible constructions that are simple and/or comfortable to operate. The stop face is preferably pivotable into a position facing the first flank, especially to reach the active position for blocking the unrolling motion of the leash roller. Positioning the locking element in a position generating disturbing noises is made markedly difficult.

The transmission means may be designed as a lever. Constructions with a suitable transmission ratio between the actuating motion of the actuating element and the locking motion of the locking element can be embodied in an especially simple manner hereby. The lever is preferably pivotable about a pivot axis directed in parallel to the axis of rotation of the leash roller.

According to another embodiment, the lever is arranged in the active position for blocking the unrolling motion with a locking angle between 10° and 60° and preferably between 20° and 50°. The locking angle is especially preferably 30°. The risk of development of disturbing noises can be reduced by up to 50% in case of such a locking angle. The locking angle is obtained here between a longitudinal direction of the lever, especially a line through the center of the pivot axis and a center of a radius of an edge of the lever and/or of the projection, and a tangent to a circumferential circle of the leash roller, wherein the contact point of the tangent with the circumferential circle is in the area of the edge of the projection. The edge of the lever faces the projection and/or the circumferential surface, especially in a pivoted position for reaching the active position.

The first flank and/or the stop face may be designed as circle segment-like surfaces, especially ones corresponding to each other. A flat contact of the stop face with the first face is made possible hereby if the stop face is pivotable about the pivot axis. A radius of the circle segment-like surfaces is preferably obtained based on a distance between the pivot axis of the transmission means and the first flank and/or stop face.

According to a variant, a locking mechanism, which can be actuated by a person, is provided for locking and/or locking the actuating element in a position for blocking the unrolling motion of the leash roller. The actuating element can thus be locked in an angular position for blocking the unrolling motion of the leash roller by means of the locking mechanism. Thus, in a position in which there is meshing with the actuating element, the actuating element cannot be moved any longer from the active position into a resting position for releasing the leash roller. As a result, the locking element also remains in its active position for blocking the unrolling motion. Continuous operation of the actuating element by a person can be avoided hereby, as a result of which the operating comfort is further improved. The locking mechanism may be designed as a displaceable and/or pivotable lever. The lever can be preferably operated by means of a finger and/or thumb.

According to a variant, a first blocking element is provided for blocking a rolling-up motion. Rolling up can thus be avoided by means of the blocking element, especially in case of a leash roller that rolls up the leash automatically by means of a retracting element. In particular, the first blocking element is provided for the joint actuation with the locking element. The first blocking element can thus be actuated together and/or simultaneously with the locking element. In an active position of the locking element for blocking the unrolling motion, an active position of the first blocking element can be able to be achieved for blocking the rolling-up motion, especially alternatively or simultaneously. In particular, both a rolling-up motion and an unrolling motion of the leash roller can be avoided, at least to a great extent. A second flank and/or a second blocking element is preferably designed for cooperating with the first blocking element in an active position for blocking the rolling-up motion. In particular, the first blocking element, on the one hand, and the second flank and/or second blocking element, preferably the one associated with the leash roller, on the other hand, are designed such that they correspond to one another.

According to a variant, a resetting element for returning from the active position for blocking the leash roller into a resting position for releasing the leash roller for an unrolling motion is associated with the locking element and/or transmission means. Reliable release of the leash and/or of the leash roller can be achieved hereby. An undesired blocking of the unrolling motion in the absence of actuation of the blocking means or of the actuating element is avoided. In addition, manufacturing tolerances can be compensated by means of the resetting element, as a result of which clearance-free actuation is ensured, in particular. The resetting element is preferably designed as a spring.

According to another embodiment, the blocking means, especially the locking element and/or transmission means, cooperates with a limiting means for setting a shorter partial leash length that differs from the maximum unrollable leash length. The unrollable leash length can thus be selected by means of the limiting means between the maximum unrollable leash length and a shorter, partial leash length differing therefrom. The unrolling motion of the leash roller can be preferably blocked when the limiting means is activated after a preset number of revolutions of the leash roller about the axis of rotation in the direction of the unrolling motion. In particular, the locking element is used to block the unrolling motion.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
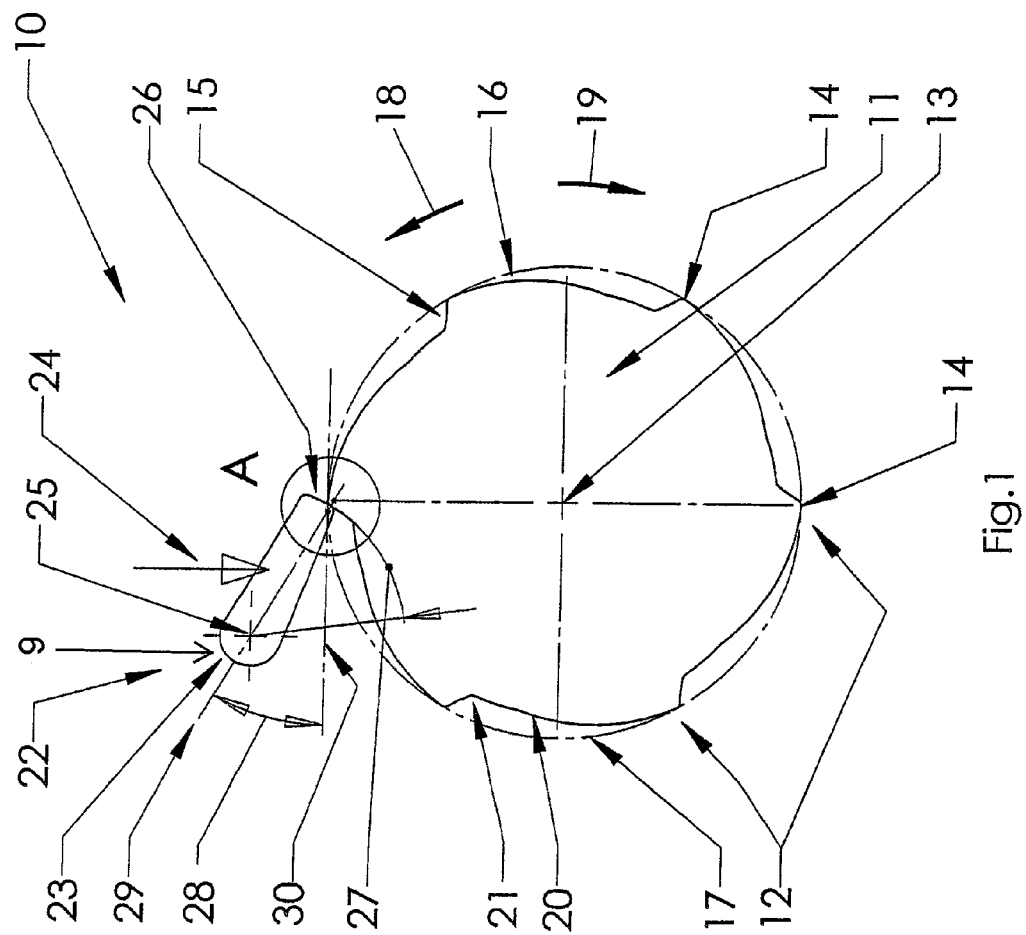
FIG. 1 is a schematic side view of a first device according to the present invention.

Referring to the drawings in particular, FIG. 1 shows a schematic side view of a first device 10 according to the present invention. Device 10 has a leash roller 11. Leash roller 11 has a plurality of projections 12, but not all projections 12 are provided with a reference number for the sake of greater clarity.

Furthermore, leash roller 11 is mounted rotatably about an axis of rotation 13. The projections 12 are arranged in the area of the circumference of the leash roller 11 and radially towards the outside towards the axis of rotation 13. A circumferential circle 17, which is indicated by a dash-dotted line here and extends concentrically about the axis of rotation 13 and whose radius is determined by the maximum distance between the axis of rotation 13 and the edges 14 of the projections 12, is associated with the leash roller 11. The projections 12 have a respective first flank 15 and a respective second flank 16. The first flank 15 and second flank 16 converge each in an edge 14 of a projection 12, edge 14 being located on the circumferential circle 17.

A leash, not shown here, can be unrolled from the leash roller 11 and rolled up on the leash roller 11 by means of the leash roller 11 and the axis of rotation 13. To unwind or unroll the leash, the leash roller 11 can be rotated in the direction of arrow 18. To wind up or roll up the leash, the leash roller 11 can be rotated in the direction of arrow 19. Starting from edge 14 of a projection 12, the respective corresponding first edge 15 is arranged in the direction of the unrolling motion according to arrow 18, whereas the respective corresponding second edge 16 is arranged in the direction of the rolling-up motion according to arrow 19 starting from edge 14.

The second flank 16 is designed as a circumferential surface 20. In the exemplary embodiment being shown here, the second flank 16 or the circumferential surface 20 has a shape with a circle segment-like cross section, which extends from a first projection 12 to a first flank 15 of a second projection 12, said first projection 12 being arranged directly in front of the second projection 12 in the unrolling direction 18.

The first flank 15 is arranged at an obtuse angle 21 in relation to the circumferential surface 20 located in front of it in the unrolling direction 18 of the first flank 15. The obtuse angle 21 equals 120° in the exemplary embodiment being shown here.

Furthermore, a blocking means 22 is provided. Blocking means 22 comprises a transfer means 23 and an actuating element, not shown in more detail here, wherein the actuating element can be moved according to arrow 24 by a person based on an actuating motion in the direction of the leash roller 11 and the circumferential circle 17. The transfer means 23 has a transmission 9. The transmission 9 may be mechanical, electric, pneumatic and/or hydraulic. An actuating motion of the operating element is transmitted here by means of the transmission means into a locking motion of a locking element 26. This takes place such that a smaller actuating motion compared to the locking motion is transmitted into a locking motion that is greater than the actuating motion. The transmission ratio of the locking motion to the actuating motion equals 2:1 in the example being shown here.

Locking element 26 is associated with the transfer means 23. Locking element 26 is designed as a stop face 26 in the exemplary embodiment being shown here.

Transfer means 23 is mounted rotatably or pivotably about a pivot axis 25. Pivot axis 25 is arranged in parallel to the axis of rotation 13. The transmission means is designed as a lever 23 in the exemplary embodiment being shown here. Starting from the pivot axis 25, a short end of lever 23 faces away from the leash roller 11 and the projections 12. A long end of lever 23 starting from the pivot axis 25 faces the leash roller 11 and the projections 12. Lever 23 has the stop face 26 at the long end. Stop face 26 is arranged on the front side at the lever 23 and the long end thereof. Thus, stop face 26 faces the leash roller 11 and the first flank 15 of the projections 14.

Stop face 26 has a design corresponding to the first flank 15. Stop face 26 and the first flank 15 are designed as surfaces that correspond to each other and have a circle segment-like cross section in the exemplary embodiment being shown here. A radius 27, which is obtained as the distance between the pivot axis 25 and the stop face 26 or the first flank 15, is associated with the circle segment-like surfaces here. Pivot axis 25 also forms the center of radius 27 at the same time. This radius equals 25 mm in the exemplary embodiment being shown here.

According to FIG. 1, lever 23 is in an active position, in which an unrolling motion of the leash roller 11 in the direction of arrow 18 is blocked, because the stop face 26 is partly in contact with the first flank 15. As an alternative to the view shown here, lever 23 may be pivoted in the direction of the leash roller 11 about the pivot axis 25 such that the stop face 26 is fully in contact with the first flank 15 and lever 23 fills out the angle 21 formed between the first flank 15 and the circumferential surface 20 and/or lever 23 is at least partly in contact with the circumferential surface 20.

In the active position, in which the unrolling motion is blocked, lever 23 is arranged with a locking angle 28, which equals 30° here. As an alternative to this, locking angles that are different from this, especially in the range of 10° to 60°, are conceivable. The locking angle 28 between a line 29 and a tangent 30 is obtained here. Tangent 30 is in contact with the circumferential circle 17 of leash roller 11.

Figure 2:
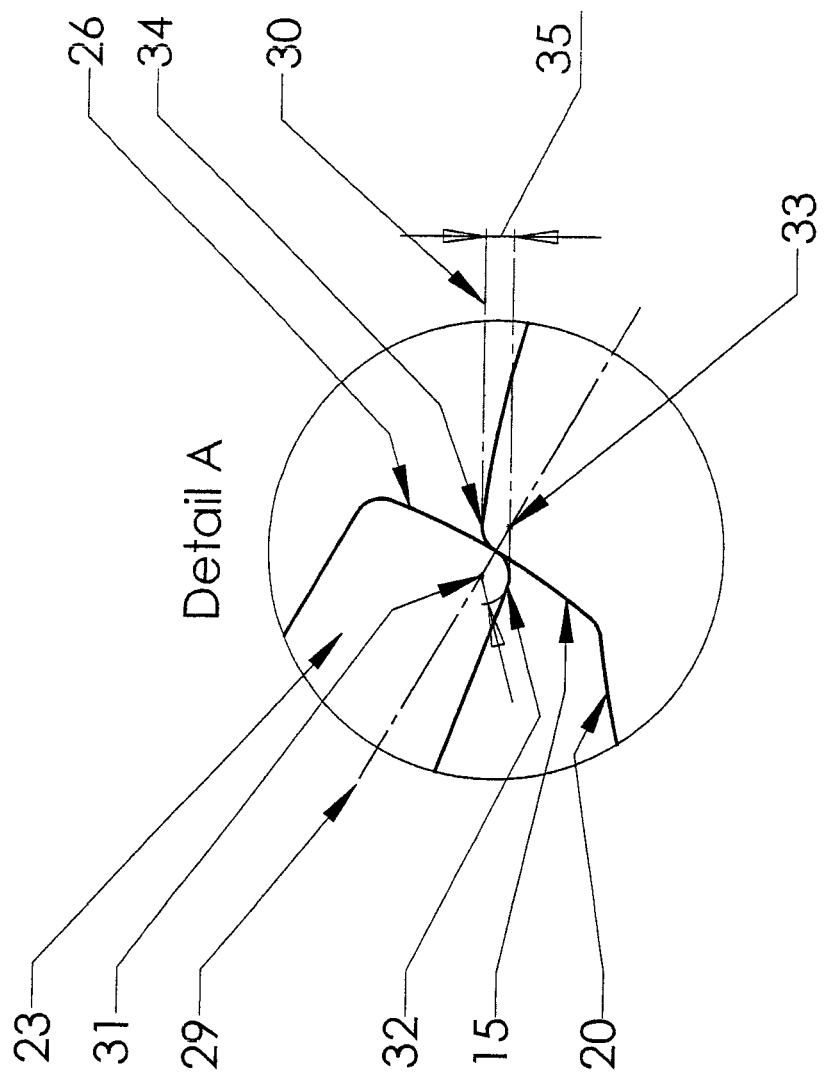
FIG. 2 is a detail view of the first device according to the present invention according to FIG. 1.

FIG. 2 shows a detail from the first device 10 according to the present invention according to FIG. 1. Elements that are identical to the ones mentioned previously bear the same reference numbers, and reference is therefore also made to the preceding description.

Line 29 extends through the center of the pivot axis 25 (see FIG. 1), a center 31 of a radius of an edge 32 of lever 23 and a center 33 of a radius of an edge 34 of the projection 12 cooperating with the locking element. Edge 32 of the stop face 26 faces the first flank 15 or the circumferential surface 20. The point in which tangent 30 contacts the circumferential circle 17, which is not shown here in detail, is in the area of edge 34 of projection 12, which is located at the maximum radial distance from the center of the axis of rotation 13.

Lever 23 is pivoted with a meshing depth in the direction of the leash roller 11 to the extent that the stop face 26 and the first flank 15 come into contact with each other in order to guarantee blocking of the unrolling motion. Unintended sliding of lever 23 over the projection 12 and the edge 34 thereof as well as a disturbing noise resulting herefrom are avoided in this active position. The minimum meshing depth necessary herefor equals 1 mm in the exemplary embodiment being shown here.

Figure 3:
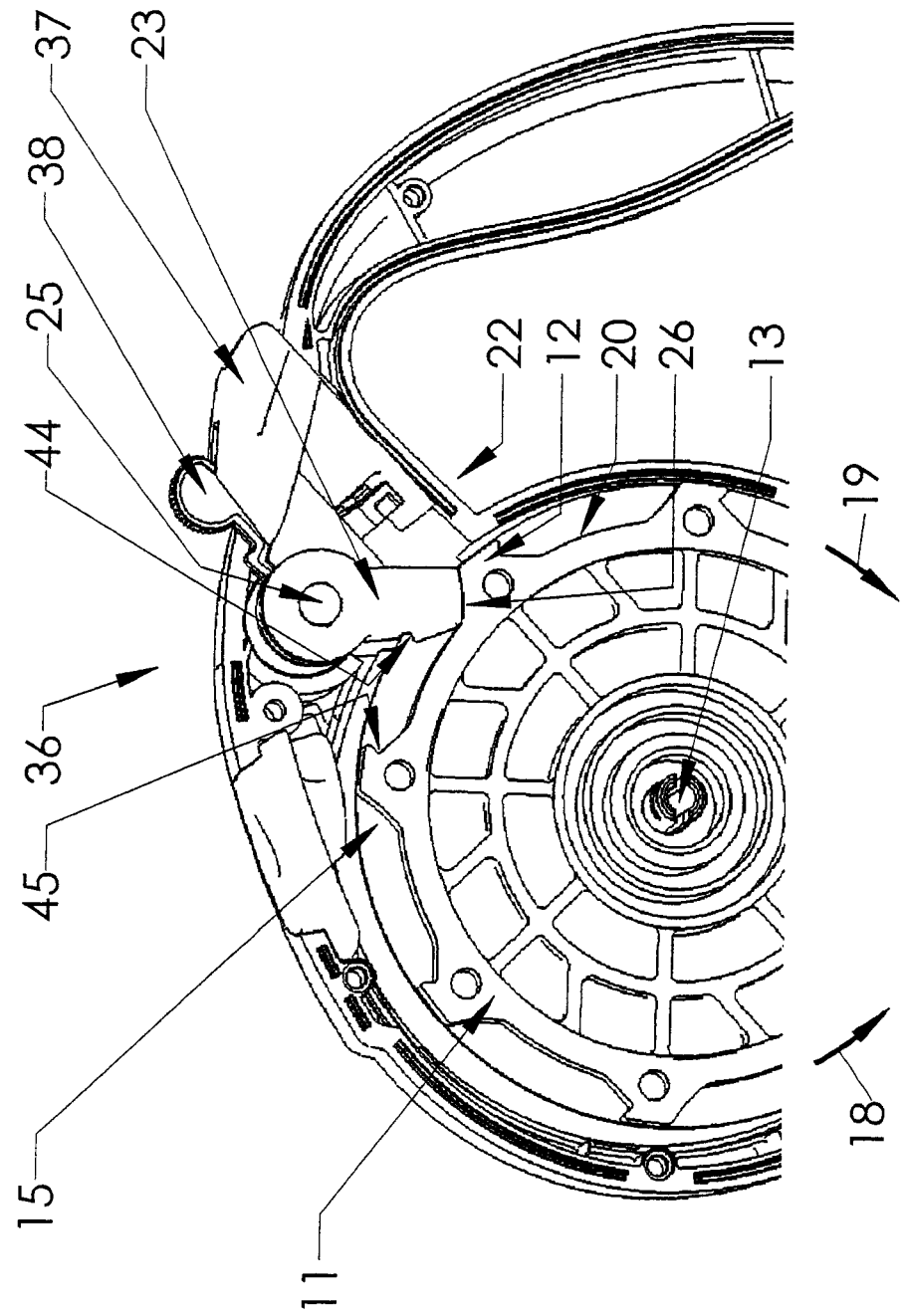
FIG. 3 is a cut-away partial perspective view of a second device according to the present invention.

FIG. 3 shows a cut-away partial perspective view of a second device 36 according to the present invention. Components that are identical to those described before carry the same reference numbers. Reference is therefore also made to the preceding description.

Device 36 has a blocking means 22 with a transfer means 23, which is mounted pivotably about a pivot axis 25. In addition, blocking means 22 has an actuating element 37. Actuating element 37 is designed as a linearly movable brake button 37 in the exemplary embodiment being shown here. Brake button 37 can be actuated by a person linearly and approximately in the direction of the axis of rotation 13 of leash roller 11 to block an unrolling motion. Brake button 37 is coupled with a transfer means 23. The actuating motion of brake button 37 can be converted hereby into a pivoting motion or locking motion of locking element 26.

Furthermore, blocking means 22 has a locking mechanism 38. Brake button 37 can be locked in a pressed position by means of locking mechanism 38. After actuating the brake button 37 to block an unrolling motion and subsequent actuation of locking mechanism 38, the brake button remains in the position in which it is pressed in the direction of the axis of rotation 13 or the leash roller 11 even when the brake button 37 is released by the person. To abolish blocking of the unrolling motion, locking mechanism 38 can be released. Based on the resetting element, not shown in more detail here, brake button 37 is moved linearly away from the axis of rotation 13 or the leash roller 11 after releasing the locking mechanism 38, as a result of which the leash roller 11 is released for an unrolling motion in the direction of arrow 18.

Transfer means 23 has a first blocking element 44. The first blocking element 44 is arranged here on a side of the transfer means 23 facing away from the locking element 26. The first blocking means 44 is designed as a detent in the exemplary embodiment being shown here. Furthermore, a second blocking element 45 is associated with the second flank 16 of the projections 12 at the leash roller 11. The second blocking element 45 is designed as a mount for the first blocking element 44. If the transfer means 23 and the locking element 26 are in an active position suitable for blocking the unrolling motion, the first blocking element 44 is also in an active position for blocking a rolling-up motion. The first blocking element 44 and the second blocking element 45 become meshed with one another for blocking a further motion in the direction of the rolling-up motion 19 during a motion of the leash roller 11 from the position according to FIG. 3 in the direction of the rolling-up motion 19. A rolling-up motion 19 and an unrolling motion 18 are thus avoided at least extensively.

Figure 4:
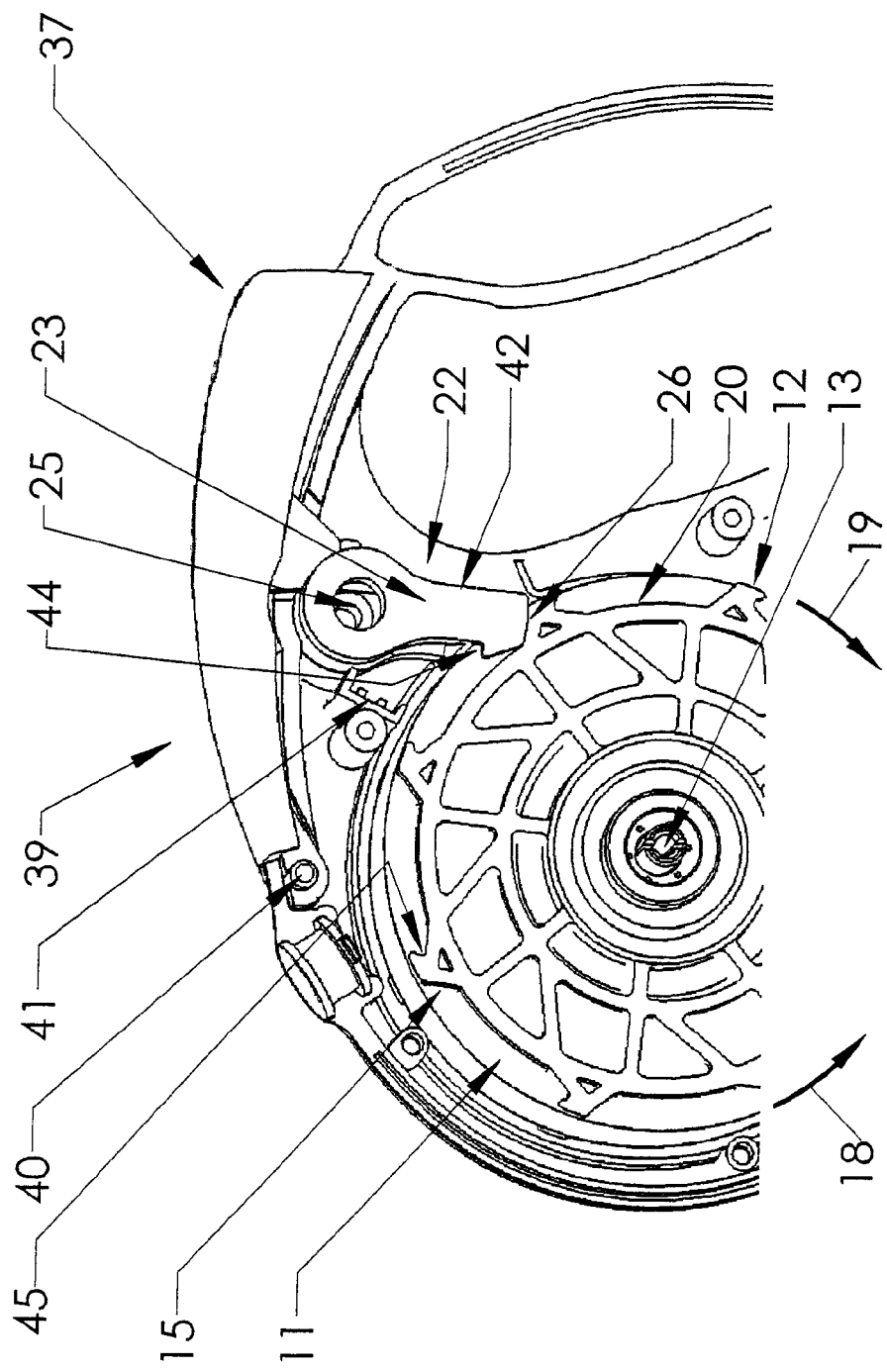
FIG. 4 is a cut-away partial perspective view of another device according to the present invention.

FIG. 4 shows a cut-away partial perspective view of another device 39 according to the present invention. Components that are identical to those mentioned before bear the same reference numbers. Reference is therefore also made to the preceding description.

Device 39 has a blocking means 22 with a transfer means 23 and an actuating element 37, said actuating element 37 being designed as a rotatably mounted brake button 37 here. Brake button 37 is mounted rotatably about an axis 40. The rotary motion of the brake button 37 acting as an actuation motion is transferred during the actuation of brake button 37 into a rotary motion acting as a locking motion. Brake button 37 is coupled with the transfer means 23 for this. Locking element 26 is associated with the transfer means 23. Based on an actuation of brake button 37 in the direction of the axis of rotation 13, blocking of the unrolling motion of leash roller 11 can be achieved by means of locking element 26.

Figure 5:
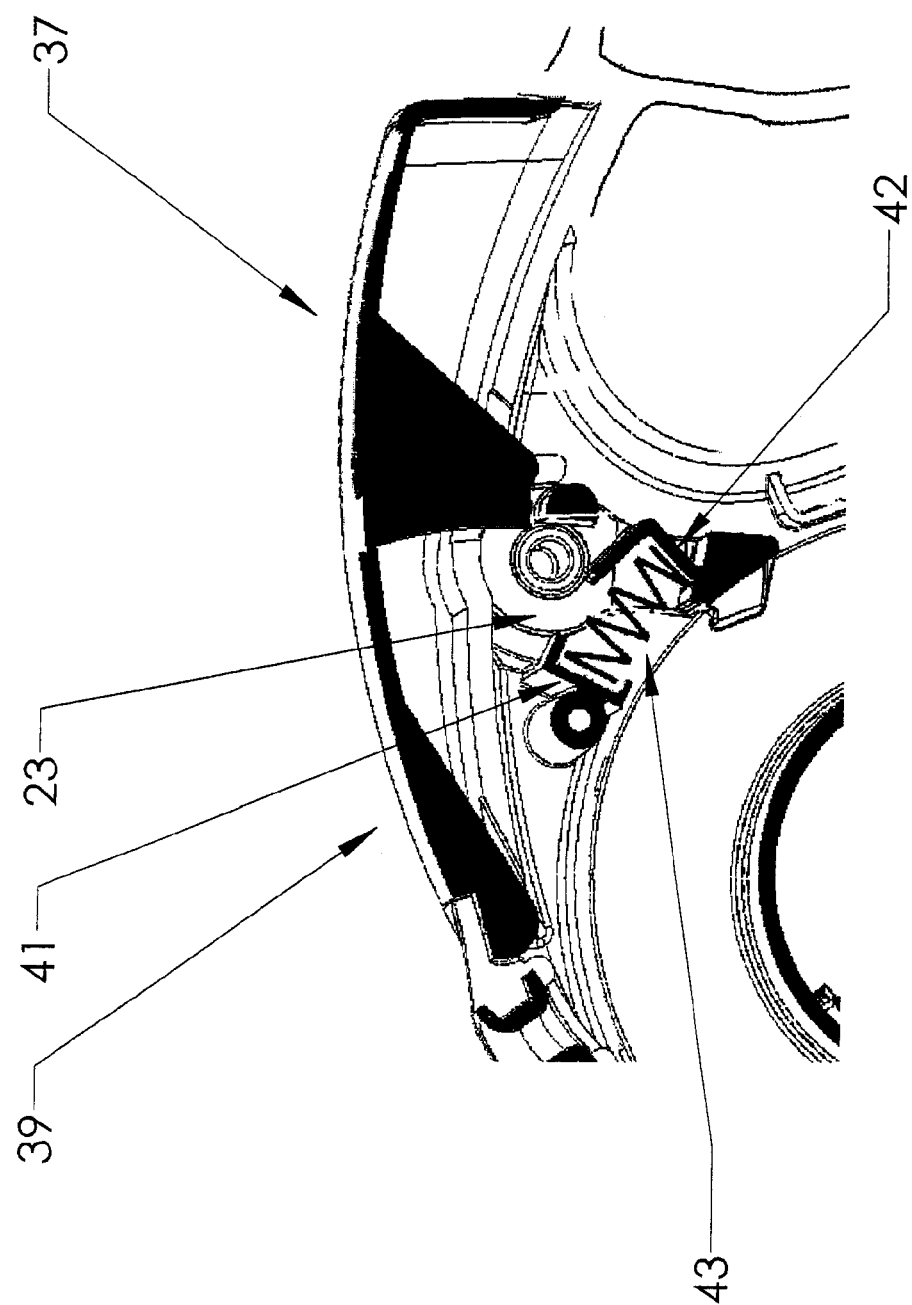
FIG. 5 is a cut-away perspective view of a detail of the other device according to the present invention according to FIG. 4 with an additional resetting element.

A first mount 41 is associated with the blocking means 22 and a second mount 42, whose function appears from FIG. 5, is associated with the transfer means 23 in the exemplary embodiment being shown here.

FIG. 5 shows a cut-away perspective view of a detail of the other device 39 according to the present invention according to FIG. 4 with a resetting element 43. Features identical to those described before bear the same reference numbers. Reference is therefore also made to the preceding description.

Resetting element 43 is arranged between the first mount 41 and the second mount 42. Resetting element 43 is designed as a compression spring 43 in the exemplary embodiment being shown here. The first mount 41 forms a fixed abutment here for the compression spring 43. The force of compression spring 43 acts as a result on the second mount 42 such that the transfer means 23, which is firmly connected to the second mount 42, is pushed from an active position for blocking an unrolling motion in the direction of a resting position for releasing the leash roller 11 for an unrolling motion.

The actuating element 37 coupled with the transfer means 23 is now also brought via the transfer means 23 into a resting position. Release of the rolling motion is guaranteed hereby when the actuating element 37 is released. In addition, a resistance preset by the resetting element 43 is to be overcome during the actuation of the actuating element 37 for blocking the unrolling motion. The risk of an unintended blocking of the unrolling motion of the leash roller 11 is prevented hereby. In addition, the operating clearance is reduced in the blocking means 22 and between the transfer means 23 and the actuating element 37.

While specific embodiments of the invention have been shown and described in detail to illustrate the application of the principles of the invention, it will be understood that the invention may be embodied otherwise without departing from such principles.

APPENDIX

10 Device
11 Leash roller
12 Projection
13 Axis of roiaiion
14 Edge
15 Firsl flank
16 Second flank
17 Circumferential circle
18 Arrow
19 Arrow
20 Circumferential surface
21 Obtuse angle
22 Blocking means
23 Transfer means
24 Arrow
25 Pivot axis
26 Locking element
27 Radius
28 Locking angle
29 Line
30 Tangent
32 Edge
33 Center
34 Edge
35 Meshing depth
36 Device
37 Actuating element
38 Locking mechanism
39 Device
40 Axis
41 First mount
42 Second mount
43 Resetting clement
44 First blocking clement
45 Second blocking element

What is claimed is:

1. A device for rolling up and unrolling a leash, the device comprising:
    a leash roller;
    a blocking means for blocking an unrolling motion of the leash roller, said blocking means comprising an actuating element and a locking element, said actuating element comprising a brake button operable by a user, said leash roller being blocked by said blocking means and said actuating element being actuated by an actuation motion, and said locking element having a pivoting motion triggered based on said actuation motion of said actuating element for blocking the unrolling motion of said leash roller; and
    a transfer means for transferring the actuation motion into the pivoting motion of the locking element that is greater than the actuation motion, said locking element being directly pivotably connected with said actuating element, said locking element being pivotable in relation to said actuating element, whereby said actuation motion of said actuating element is directly converted to said pivoting motion, said locking element being moved in an active position for blocking the unrolling motion of the leash roller via said actuating element.

2. A device in accordance with claim 1, wherein the transfer means comprises at least one of a mechanical, electric, pneumatic and/or hydraulic transmission, including a lever mechanism, wherein a transmission ratio between the locking motion and the actuation motion is in the range of 1.25:1 to 10:1.

3. A device in accordance with claim 1, wherein:
    said leash roller comprises a projection and a flank of said projection cooperates with said locking element in an active position for blocking the unrolling motion;
    said flank of said projection is arranged with an obtuse angle, as an obtuse opening angle, in relation to a circumferential surface of said leash roller.

4. A device in accordance with claim 3, wherein:
    said leash roller comprises a plurality of projections including said projection and at least an additional projection having another flank at a leash roller circumferential surface; and
    said obtuse opening angle is between 100° and 150°.

5. A device in accordance with claim 1, wherein:
    said locking element comprises a stop face;
    said stop face is arranged at the transfer means or said stop face is a part of said transfer means;
    said transfer means comprises a lever.

6. A device in accordance with claim 5, wherein said stop face is pivotable tangentially and/or at least in a circle segment-like manner about a pivot axis, wherein said stop face is preferably pivotable in a position facing said flank, for reaching the active position for blocking the unrolling motion, said stop face being in contact with at least a portion of a flank of said leash roller in said active position for blocking the unrolling motion of said leash roller, said lever comprising a first lever portion and a second lever portion, said first lever portion having a first lever end portion facing in a direction away from the leash roller, said first lever end portion being located at a first distance from said pivot axis, said second lever portion comprising stop face, said stop face being located at a second distance from said pivot axis, said first distance being less than said second distance.

7. A device in accordance with claim 1, wherein said transfer means comprises a lever, said lever pivoting about a pivot axis directed in parallel to an axis of rotation of said leash roller, said lever comprising a first lever portion and a second lever portion, said first lever portion extending from said pivot axis to one end of said lever, said second lever portion extending from said pivot axis to another end of said lever, said first lever portion having a length that is less than a length of said second lever portion.

8. A device in accordance with claim 7, wherein:
    said leash roller comprises a projection and a flank of said projection cooperates with said locking element in an active position for blocking the unrolling motion;
    said lever is arranged in an active position for blocking the unrolling motion with a locking angle between 10° and 60°;
    said locking angle is obtained between a longitudinal orientation of said lever, based on a line through a center of the pivot axis, and a center of a radius of an edge of said lever and/or of said projection, and a tangent to a circumferential circle of said leash roller; and a contact point between the tangent and the circumferential circle is in the area of an edge of said projection.

9. A device in accordance with claim 1, wherein:

said transfer means comprises a lever, said lever pivoting about a pivot axis directed in parallel to an axis of rotation of said leash roller;

said leash roller comprises a plurality of projections, each having a flank at a leash roller circumferential surface;

said locking element comprises a stop face corresponding to said flank;

at least one of said first flank and said stop face are designed as circle segment-like surface;

a radius of said circle segment-like surfaces is obtained as a distance between a pivot axis of said transfer means and said at least one of said first flank and said stop face.

10. A device in accordance with claim 1, further comprising:

a locking mechanism for locking said actuating element in a position for blocking the unrolling motion of the leash roller.

11. A device in accordance with claim 1, further comprising:

a blocking element for blocking a rolling-up motion of the leash roller, the unrolling motion being in a direction opposite to the rolling-up motion, wherein a second flank and/or a second blocking element cooperates with the blocking element in an active position for blocking the rolling-up motion.

12. A device in accordance with claim 1, further comprising:

a resetting element associated with at least one of the locking element and the transfer means, the resetting element for returning from the active position for blocking the leash roller into a resting position for releasing the leash roller for the unrolling motion, said resetting element comprising a spring.

13. A device in accordance with claim 1, further comprising:

a limiting means for setting a preset partial leash length differing from a maximum unrollable leash length wherein at least one of said locking element and said transfer means cooperates with said limiting means for setting a preset partial leash length differing from a maximum unrollable leash length.

14. A device for rolling up and unrolling a leash, the device comprising:

a leash roller;

an actuating element comprising a brake button operable by a user;

a locking element;

an actuating element having an actuation motion, and said locking element having a locking motion triggered based exclusively on said actuation motion of said actuating element for blocking an unrolling motion of said leash roller, wherein said locking element is pivoted to an active position for blocking the unrolling motion of said leash roller exclusively via actuation of said actuating element; and a transfer device for transferring the actuation motion into the locking motion of the locking element with the locking motion being greater than the actuation motion, said locking element being directly connected to said actuating element, wherein said locking element is movable relative to said actuating element.

15. A device in accordance with claim 14, wherein the transfer device comprises at least one of a mechanical, electric, pneumatic and/or hydraulic transmission, including a lever mechanism, wherein a transmission ratio between the locking motion and the actuation motion is in the range of 1.25:1 to 10:1.

16. A device in accordance with claim 15, wherein:

said leash roller comprises a plurality of projections each with a flank, each of said projections cooperating with said locking element in an active position for blocking the unrolling motion;

said lever is arranged in an active position for blocking the unrolling motion with a locking angle between 10° and 60°;

said locking angle is an angle between a longitudinal orientation of said lever, based on a line through a center of the pivot axis, and a center of a radius of an edge of said lever and/or of said projection, and a tangent to a circumferential circle of said leash roller; and a contact point between the tangent and the circumferential circle is in the area of an edge of said projection.

17. A device in accordance with claim 14, further comprising:

a locking mechanism for locking said actuating element in a position for blocking the unrolling motion of the leash roller; and a blocking element for blocking a rolling-up motion of the leash roller, the unrolling motion being in a direction opposite to the rolling-up motion, said transfer device comprising a lever, said lever pivoting about a pivot axis directed in parallel to an axis of rotation of said leash roller, said lever comprising a first lever portion and a second lever portion, said first lever portion extending from said pivot axis to one end of said lever, said second lever portion extending from said pivot axis to another end of said lever, said first lever portion having a length that is less than a length of said second lever portion.

18. A device in accordance with claim 14, further comprising;

a resetting element associated with at least one of the locking element and the transfer device, the resetting element for returning from the active position for blocking the leash roller into a resting position for releasing the leash roller for the unrolling motion, said resetting element comprising a spring, said locking element comprising a stop face, said stop face being arranged at the transfer device or said stop face is a part of said transfer device, said transfer device comprising a lever.

19. A device in accordance with claim 14, further comprising:

a limiting device for setting a preset partial leash length differing from a maximum unrollable leash length wherein at least one of said locking element and said transfer device cooperates with said limiting device for setting a preset partial leash length differing from a maximum unrollable leash length.

20. A device for rolling up and unrolling a leash, the device comprising:

a leash roller;

an actuating element;

a locking element directly pivotably connected to said actuating element, wherein said locking element is movable relative to said actuating element, said actuating element having an actuation motion, and said locking element having a pivoting motion triggered based on said actuation motion of said actuating element for blocking an unrolling motion of said leash roller, wherein said actuating motion of said actuating element is converted directly into said pivoting motion of said locking element based on actuation of said actuating element, said actuating element being pivoted to an active position for blocking the unrolling motion of said leash roller via said actuating motion of said actuating element.

\* \* \* \* \*